United States Patent [19]

Sikorski

[11] Patent Number: 4,954,387

[45] Date of Patent: Sep. 4, 1990

[54] COMPOSITE MATERIAL OF METAL AND PLASTIC

[75] Inventor: Siegfried Sikorski, Munich, Fed. Rep. of Germany

[73] Assignee: MTU Motoren-und Turbinen-Union Munchen GmbH, Munich, Fed. Rep. of Germany

[21] Appl. No.: 202,792

[22] Filed: Jun. 3, 1988

[30] Foreign Application Priority Data

Jun. 4, 1987 [DE] Fed. Rep. of Germany ....... 3718676

[51] Int. Cl.⁵ .......................... B32B 3/24; B32B 7/08; B32B 15/08
[52] U.S. Cl. .................................. 428/138; 428/227; 428/228; 52/309.15
[58] Field of Search ....................... 428/138, 227, 228; 52/309.7, 309.15, 309.16

[56] References Cited

U.S. PATENT DOCUMENTS

| 2,581,532 | 1/1952 | Hem | 52/309.16 |
|---|---|---|---|
| 3,068,043 | 12/1962 | Komenda | 428/138 |
| 3,417,570 | 12/1968 | Pegan et al. | 52/309.15 |
| 3,470,598 | 10/1969 | Berthelsen | 52/309.16 |
| 3,778,949 | 12/1973 | Hollerich | 52/309.16 |
| 4,229,473 | 10/1980 | Elber | 428/138 |
| 4,234,638 | 11/1980 | Yamazoe et al. | 428/138 |
| 4,341,831 | 7/1982 | Kleiss | 52/309.16 |
| 4,355,448 | 10/1982 | Ezaki | 428/138 |
| 4,673,606 | 6/1987 | Undén et al. | 428/138 |
| 4,687,691 | 8/1987 | Kay | 428/138 |

FOREIGN PATENT DOCUMENTS

| 616577 | 3/1961 | Canada | 52/309.16 |
|---|---|---|---|
| 1295172 | 5/1969 | Fed. Rep. of Germany | 52/309.7 |
| 1559464 | 9/1969 | Fed. Rep. of Germany | . |
| 2830717 | 1/1980 | Fed. Rep. of Germany | 428/138 |
| 2851526 | 6/1980 | Fed. Rep. of Germany | . |
| 2225989 | 6/1923 | France | 52/309.15 |
| 566793 | 1/1945 | United Kingdom | 52/309.15 |
| 2109303A | 6/1983 | United Kingdom | 428/138 |

Primary Examiner—John J. Zimmerman
Attorney, Agent, or Firm—Ladas & Parry

[57] ABSTRACT

A composite material is produced from a metal core and fiber-reinforced plastic material, in which the reinforcing fibers penetrate into and entwine around the metal core without coming into contact with the metal core. Parts for aircraft and turbine construction can be made from the composite material to provide higher impact strength and rigidity at less weight as compared to metal components.

10 Claims, 1 Drawing Sheet

COMPOSITE MATERIAL OF METAL AND PLASTIC

FIELD OF THE INVENTION

This invention relates to a composite material composed of a metal and plastic material in which a metal substrate is embedded in the plastic material and is provided with apertures forming passageways.

PRIOR ART

Composite materials with a textile-fiber and textile-cord substrate or core and a matrix of thermoplastic or thermosetting materials have been disclosed in DE-OS No. 28 51 526. Such composite materials have disadvantages that they do not satisfy the requirements of dimensional stability, rigidity and notch strength for aircraft and turbine construction, for example, for tail assemblies and engine components.

Such disadvantages are exhibited also by composite materials having a plastic matrix and a lattice or mesh type reinforcement formed, for example by wires, as disclosed in DE-OS No. 15 59 464. This arrangement is further deficient due to differences in thermal expansion between the metal mesh and the plastic matrix, which under extreme thermal loads, such as on aircraft tail assemblies and engine components, may destroy the composite material.

SUMMARY OF THE INVENTION

In a broad aspect of the present invention, therefore, a composite of metal and plastic materials is provided in which, on the one hand, temperature effects are substantially prevented from being transmitted through the generally thermally conductive metal and, on the other hand, the composite can be given greater fracture and impact strength than the non-metallic material would possess alone.

In accordance with the invention, a composite material is formed from a flat metal substrate provided with a plurality of apertures distributed therein embedded in a body of synthetic resin material, all with a plurality of reinforcing fibers wound through the apertures without coming substantially into contact with the substrate.

The invention enables expensive metallic raw materials to be economized, and despite the greater strength and rigidity in comparison with these metals and the composite materials disclosed in DE-OS No. 28 51 526 and DE-OS No. 15 59 464, an approximate weight saving of up to 30% is achieved over metallic raw materials, depending on the composite component.

This invention permits the metal substrate to be ideally embedded in the fiber-reinforced plastic with a bond that exceeds mere cementing. The metal substrate can be made very thin, i.e. less than 1 mm, to economize material. Layers of graphite, carbon, aromatic polyamide or glass fiber can be built into layers 0.05 to 0.2 mm thick.

This invention creates a number of novel potential applications for such a composite material, which in this domain is counted among the group of hybrids. An essential advantage provided by such material is its low weight, its good processability and the high quality of its finish. Parts of such composite material can be simply and cheaply manufactured in bulk. The composite finds advantageous uses in engine and airframe construction, i.e. in the aerospace industry. It finds applications also in stationary plants and in vehicles. It can be used in the manufacture of complete tail assemblies, fuselages, wing skins, shells, flaps, fairings, radomes, casings, intermediate and outer casings, and the like.

By constructing the composite material from a metal core and a fiber-reinforced plastic, where the metal core is multiply joined to the plastic without establishing contact between the metal core and the reinforcing fiber, one great advantage is obtained that the stronger constituent, especially when it is the metallic material, has superior elongation and still absorbs energy when the reinforcing fibers, filaments, or similar means, like those disclosed in DE-OS No. 28 51 526, have already broken—a situation that can readily occur under high mechanical loads, such as impact load. For this purpose, the metallic material has apertures to form passageways, such as bores, holes, pores, ducts or other cavities, through which the reinforcing fibers in the form of filaments, fibers or whiskers can singly or in groups of two or more be linked together to form fabrics, nets, mats, felts or laminates. In the process, the reinforcing fibers pass through the openings or cavities in the metal core, or are guided, pulled or forced through them, optionally by a mechanical method such as employed in a sewing machine, where the individual reinforcing fibers are advantageously first impregnated with plastic or the cavities of the metal core are first infiltrated therewith, while the plastic material is still in a plastic condition. In this manner, the thermal expansion and the modulus of elasticity of the metal core are adapted to suit those of the reinforcing fibers and of the plastic matrix penetrating and surrounding the metal core.

The plastic material can be a synthetic resin and thermoplastic materials can be used to great advantage, because they bond well with the metal core and readily penetrate into the passageways in the metal core. The reinforcing fibers can be inserted, pulled or pressed into position as long as the thermoplastic has not rehardened. Use can be made also of durometer materials, such as ABS or other thermosetting synthetic resins.

For the metal core, this is advantageously made of materials selected from the group including steel, superalloys, titanium, aluminum, copper, metals from the platinum group (sub-group VIII of the Periodic Table) and alloys containing at least one of these metals.

According to an advantageous aspect of the present invention, a metal-plastic fiber precomposite consisting of a plastic-infiltrated metal core and plastic-impregnated reinforcing fibers of non-metallic filaments, fibers, whiskers, or fabrics, nets or similar structures made therefrom, is manufactured in a first step, after which a sandwich-type laminate or a semifinished or nearly finished end product or the finished part is manufactured. For this type of molding in plastic material, various spraying, casting or pressing processes, particularly cold or hot pressing, are employed as they are commonly practiced in the plastics industry.

Various intermediate steps, especially pre- and post-treatment, can be used as desired to suit the starting materials or the desired final condition. An injection compound containing carbon, for example, can be decarbonized, or a base part or a substrate can be siliconized or nitrided. Similarly, a base part or substrate already containing carbon can at least partially be converted into a carbide, and elements that can be made to react in a hydrogenous atmosphere, can be treated in a hydrogenous atmosphere during deposition by reactive sputtering, dusting or ion bombardment.

A special advantage is afforded also when in a pretreatment process for the plastic material, particulate substances such as metal particles in the form, for example, of powder, flakes or whiskers, are admixed with the plastic, because this will produce a more favorable, or more gradual transition or the coefficient of thermal expansion from the metal core to the fiber-reinforced plastic material.

In another advantageous aspect of the present invention, the surface can finally be improved by enameling, glazing or metallizing. The composite material can be metallized in various ways known from the manufacture of substrates for printed circuit boards used in the electronic circuitry. Also dispersion or doping of particles of foreign materials in surfaces by high-energy beams is a conventional practice that can be used. Advantageously, the plastic materials permit cross-linking and/or curing in a mould.

Embodiments of the present invention are described more fully with reference to the accompanying drawings, where they are shown schematically.

DETAILED DESCRIPTION OF PREFERRED EMBODIMENTS

Figure 1:
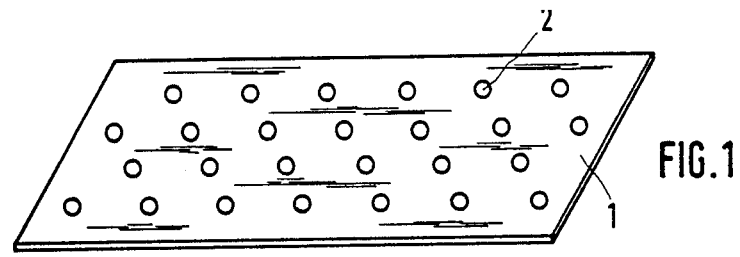
FIG. 1 illustrates a metal substrate or core of a composite material.
Figure 4:
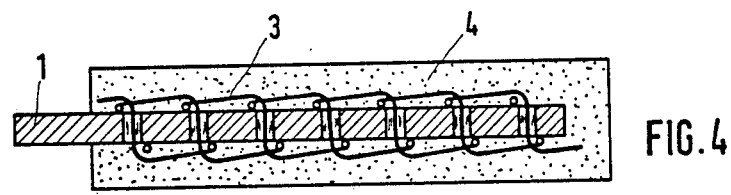
FIG. 4 is a sectional view which illustrates a laminated composite material of sandwich construction having a metal core.

With reference now to FIG. 1, therein is seen a metal core or substrate 1 of a composite product which will be referred to as a composite material and is generally indicated in FIG. 4 by numeral 4. The core 1 is substantially flat and can be a metallic panel, layer, sheet or similar structure of small thickness, especially in a sheet gage in the millimeter range and less. The core 1 is provided with openings 2 incorporated in the metal by electroplating, through-cladding, etching, drilling, eroding or similar process. The openings 2 are arranged in a desired size in a uniform or irregular spacing over the surface of the metal core 1. An important consideration in this context is that the openings 2 should be larger than the reinforcing fibers to pass therethrough, but not very much so, just enough so that plastic impregnation or infiltration creates a spacing between the metal core 1 and the reinforcing fibers 3 so that contact of the reinforcing fibers 3 with the metal core is prevented, especially in areas where the reinforcing fibers 3 pass through the openings 2.

The number and distribution of the openings 2 in the metal core is selected such that the mechanical strength of the metallic portion as a whole is not greatly reduced. The metal core 1 can be manufactured by rolling, for example, metal sheet or otherwise especially as a tape, produced by film-deposition techniques using vapor-deposition, electroplating or chemical deposition processes. In the process a removable plastic substrate can temporarily be joined to the metal core, or vice versa. The openings or apertures 2 in the metal core 1 can be round bores, round holes, pores or the like, and the reinforcing fibers are a material such as an aromatic polyamide, carbon or glass, or a hybrid combining two or more of these materials.

Figure 2:
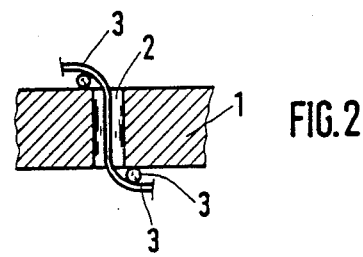
FIG. 2 is a sectional view on enlarged scale which illustrates the metal core joined to a reinforcing fiber.

FIG. 2 illustrates a reinforcing fiber 3 passing through one of the openings 2 in the metal core 1. To prevent direct contact of the reinforcing fibers 3 with the metal core 1, the reinforcing fibers are linked together singly or in groups of two or more after having been impregnated or coated, e.g. by dipping, and/or chemically treated with synthetic resin, such as epoxy resin or polyimides.

Alternatively, the metal core 1 in the form of a sheet, laminate, foam or the like, is soaked with the above-mentioned plastic materials, i.e. it is infiltrated, especially its openings, again by dipping or similar method, to make sure that the reinforcing fibers 3 can pass through the openings 2 without coming into contact with the metal because the plastic keeps them separated.

Figure 3:
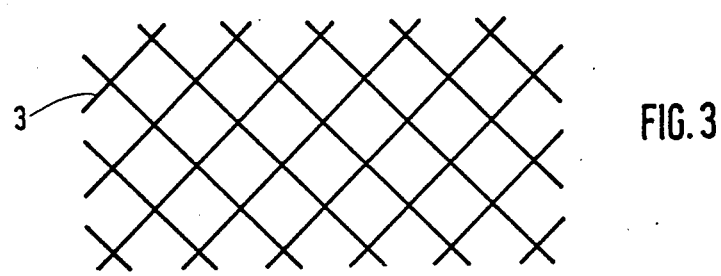
FIG. 3 is a plan view of a fiber structure showing warp and weft threads thereof.

FIG. 3 illustrates an advantageous arrangement of the reinforcing fiber 3 as a fiber structure, where the reinforcing fiber 3 is first joined to the metal core 1 by a weaving or winding technique, namely by forming warp and weft threads wound through the openings 2 to produce a fabric or similar netting interwoven in the metal core 1 and at least partially surrounding the core to form a metal-plastic fiber composite.

FIG. 4 illustrates the composite material in a laminated sandwich form brought to its final shape from the metal-plastic fiber precomposite by spraying, pressing, casting or otherwise coating it to form a semifinished product or laminate. In the process the metal core 1 can project from the composite at one or both sides. In FIG. 4 the core 1 projects from one side. When using a plastic material, such as a thermoplastic material, a spraying or casting process is recommended for synthetic resins such as polyethylene, and a pressing process for polyimides. A thermal hardening cycle, a cross-linking cycle and/or a curing cycle can be used as an intermediate or post-treatment, especially with an additional dispersion process for particulate matter.

The laminated sandwich shapes or composite materials of multiply vertically alternating construction or optionally with a protruding metal core 1 for anchorage, may be made in the form of endless semifinished products to be cut to length, for example, a tape, especially when they are made by injection molding or pressing methods, or they may be in the near-net shape of a component requiring but a small amount of finishing, or they may come as a finished product (i.e. with final dimensions).

The invention has been described in relation to specific embodiments thereof. However, it will become obvious to those skilled in the art that numerous modifications and variations can be made within the scope and spirit of the invention as defined in the attached claims.

What is claimed is:

1. A composite material comprising a flat metal substrate provided with a plurality of apertures distributed therein, a body of plastic material in which said flat metal substrate is embedded and a plurality of reinforcing fibers on said substrate and wound through said apertures, said reinforcing fibers being embedded with said substrate in said plastic material and being substantially out of contact with said substrate.

2. A composite material as claimed in claim 1 wherein said flat metal substrate is a foil or laminate.

3. A composite material as claimed in claim 2 wherein said fibers are carbon, glass or aromatic polyamide.

4. A composite material as claimed in claim 3 wherein said plastic material is a thermoplastic or a durometer material.

5. A composite material as claimed in claim 1 wherein said metal substrate is a metal selected from the group consisting of titanium, aluminum, copper, an element from Group VIII of the Periodic Table, or alloys thereof.

6. A composite material as claimed in claim 1 wherein said fibers comprise individual filaments.

7. A composite material as claimed in claim 1 wherein said fibers are wound as a fabric, fleece, felt, mat, web or mesh.

8. A composite material as claimed in claim 1 wherein said apertures are round holes.

9. A composite material as claimed in claim 1 wherein said metal substrate protrudes from said body of plastic material.

10. A composite material as claimed in claim 9 wherein said metal substrate where it protrudes from said body of plastic material is devoid of said reinforcing fibers.

* * * * *